US009556954B2

(12) United States Patent
Hou et al.

(10) Patent No.: US 9,556,954 B2
(45) Date of Patent: Jan. 31, 2017

(54) SYSTEM AND METHOD FOR PERFORMING SHUTTLE SHIFTS WITH A TRANSMISSION OF A WORK VEHICLE

(71) Applicant: CNH Industrial America, LLC, New Holland, PA (US)

(72) Inventors: Yanming Hou, Rochester, MN (US); Garth Harvey Bulgrien, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 122 days.

(21) Appl. No.: 14/405,441

(22) PCT Filed: Jun. 5, 2013

(86) PCT No.: PCT/US2013/044232
§ 371 (c)(1),
(2) Date: Dec. 4, 2014

(87) PCT Pub. No.: WO2013/184751
PCT Pub. Date: Dec. 12, 2013

(65) Prior Publication Data
US 2015/0101431 A1    Apr. 16, 2015

Related U.S. Application Data

(60) Provisional application No. 61/656,559, filed on Jun. 7, 2012.

(51) Int. Cl.
*F16H 61/00* (2006.01)
*F16H 61/02* (2006.01)
(Continued)

(52) U.S. Cl.
CPC .......... *F16H 61/0246* (2013.01); *F16H 59/20* (2013.01); *F16H 61/0059* (2013.01);
(Continued)

(58) Field of Classification Search
CPC ............ F16H 2037/049; F16H 61/0246; F16H 61/684; F16H 59/20; F16H 61/0059; F16H 2312/08; F16H 2312/09; Y10T 74/1926; B60Y 2200/14; B60Y 2300/18041
See application file for complete search history.

(56) References Cited

U.S. PATENT DOCUMENTS 4,090,414 A * 5/1978 White ................. F16H 61/0272
74/335
4,601,681 A * 7/1986 Costelli .................. F16H 61/66
474/11
(Continued)

FOREIGN PATENT DOCUMENTS

| EP | 1422449 B1 | 9/2010 |
|---|---|---|
| EP | 1908996 A3 | 6/2011 |
| WO | WO 2004/076888 A1 | 9/2004 |

OTHER PUBLICATIONS

International Search Report—PCT/US2013/044232, (11 Pages), Dated August 22, 2013.

*Primary Examiner* — Victor MacArthur
(74) *Attorney, Agent, or Firm* — Rickard K. DeMille; Rebecca L. Henkel

(57) ABSTRACT

A method for performing a shuttle shift with a transmission of a work vehicle is disclosed, wherein the transmission includes an input shaft, a counter shaft and a plurality of driven shafts extending generally parallel to the input and counter shafts. The method may include disengaging a clutch associated with a first directional gear of a directional shaft of the plurality of driven shafts. The first directional gear may be configured to rotate the directional shaft in a first direction. Additionally, the method may include engaging clutches associated with at least two gears of at least one secondary driven shaft of the plurality of driven shafts to (Continued)

reduce a rotational speed of the directional shaft and, after the rotational speed of the directional shaft is reduced, engaging a clutch associated with a second directional gear of the directional shaft such that the directional shaft rotates in a second direction.

17 Claims, 4 Drawing Sheets

(51) Int. Cl.
 *F16H 59/20* (2006.01)
 *F16H 61/684* (2006.01)
(52) U.S. Cl.
 CPC ........ *F16H 61/684* (2013.01); *B60Y 2200/14* (2013.01); *B60Y 2300/18041* (2013.01); *F16H 2312/08* (2013.01); *F16H 2312/09* (2013.01); *Y10T 74/1926* (2015.01)

(56) References Cited

U.S. PATENT DOCUMENTS

| | | | |
|---|---|---|---|
| 4,628,768 A | 12/1986 | Omura et al. | |
| 4,989,470 A * | 2/1991 | Bulgrien | B60W 10/02 74/335 |
| 5,036,718 A | 8/1991 | Bulgrien | |
| 5,353,662 A | 10/1994 | Vaughters | |
| 5,875,680 A | 3/1999 | Lorriette | |
| 5,901,606 A | 5/1999 | Umemoto et al. | |
| 5,916,291 A | 6/1999 | McKee | |
| 6,026,699 A | 2/2000 | Heitz et al. | |
| 6,212,966 B1 | 4/2001 | Barton et al. | |
| 6,612,193 B2 | 9/2003 | Umemoto et al. | |
| 7,500,410 B2 | 3/2009 | Tsuji | |
| 8,105,203 B2 | 1/2012 | Ishii et al. | |
| 2004/0094381 A1* | 5/2004 | Versteyhe | F16H 61/00 192/13 R |
| 2006/0243513 A1 | 11/2006 | Tsuji | |

* cited by examiner

SYSTEM AND METHOD FOR PERFORMING SHUTTLE SHIFTS WITH A TRANSMISSION OF A WORK VEHICLE

CROSS-REFERENCE TO RELATED APPLICATIONS

This application is based upon and claims priority to U.S. Provisional Patent Application No. 61/656,559, filed Jun. 7, 2012 and entitled "System and Method for Performing Shuttle Shifts with a Transmission of a Work Vehicle," the disclosure of which is hereby incorporated by reference herein in its entirety for all purposes.

FIELD OF THE INVENTION

The present subject matter relates generally to work vehicles and, more particularly, to a system and method for performing a shuttle shift with a transmission of a work vehicle.

BACKGROUND OF THE INVENTION

Work vehicles, such as agricultural vehicles, earth-moving vehicles, off-road vehicles, loaders and/or the like, often include power shift transmissions equipped with the capability to perform shuttle shifts, wherein the direction of travel of the work vehicle may be reversed without requiring the operator to change gears or use the clutch. For example, to change the direction of travel from forward to reverse, an operator may be simply required to move a shuttle lever disposed within the operator's cab from a forward position to a reverse position.

To increase the productivity and efficiency of work vehicles, efforts have been made to reduce the amount of time required for the transmission to perform a shuttle shift. However, to reduce the time required to perform a shuttle shift, the magnitude of the loads transmitted through the transmission must be increased. For example, to quickly perform a shuttle shift, the inertia of the high speed components of the transmission, as well as the momentum of the work vehicle, must be overcome by the clutches of the transmission within a short period time. This results in significant thermal loads and torque loads being transmitted through the clutches, which can significantly damage the clutches and/or other components of the transmission.

Currently, conventional shuttle methods utilize the clutches associated with the directional gears of the transmission to slow down and reverse the direction of the shafts of the transmission. For example, if a work vehicle is initially traveling in a forward direction, the clutch associated with the forward gear may be disengaged at the initiation of the shuttle shift. The clutch associated with the reverse gear may then be engaged to slow down or stop one or more of the transmission shafts as well as to speed up such shaft(s) in the opposite direction. However, the shaft(s) associated with the forward and reverse gears is typically a high speed shaft(s) that is configured to be driven directly (or indirectly via a counter shaft) by the input shaft. Thus, the clutches for the forward and reverse gears are typically configured to transmit lower torque loads than the clutches associated with the other, lower-speed shafts of the transmission. Specifically, the clutches for the forward and reverse gears are often relatively small and have low torque carrying capacities. As a result, the use of such clutches in performing shuttle shifts can lead to substantial damage to the clutches and/or other components of the transmission.

Accordingly, a system and method for performing shuttle shifts that reduces likelihood of damage occurring to one or more of the components of a work vehicle's transmission would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for performing a shuttle shift with a transmission of a work vehicle, wherein the transmission includes an input shaft, a counter shaft and a plurality of driven shafts extending generally parallel to the input and counter shafts. The method may generally include disengaging a clutch associated with a first directional gear of a directional shaft of the plurality of driven shafts. The first directional gear may be configured to rotate the directional shaft in a first direction. In addition, the method may include engaging clutches associated with at least two gears of at least one secondary driven shaft of the plurality of driven shafts to reduce a rotational speed of the directional shaft and, after the rotational speed of the directional shaft is reduced, engaging a clutch associated with a second directional gear of the directional shaft such that the directional shaft rotates in a second direction.

In another aspect, the present subject matter is directed to a system for performing a shuttle shift when operating a work vehicle. The system may generally include a transmission having an input shaft, a counter shaft and a plurality of driven shafts extending generally parallel to the input and counter shafts. The driven shafts may include a directional shaft and at least one secondary shaft. In addition, the system may include a controller communicatively coupled to the transmission. The controller may be configured to disengage a clutch associated with a first directional gear of the directional shaft as the directional shaft is rotated in a first direction. The controller may be further configured to engage clutches associated with at least two gears of the at least one secondary driven shaft in order to reduce a rotational speed of the directional shaft after the clutch associated the first directional gear is disengaged. In addition, after the rotational speed of the directional shaft is reduced, the controller may be configured to engage a clutch associated with a second directional gear of the directional shaft such that the directional shaft is rotated in a second direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
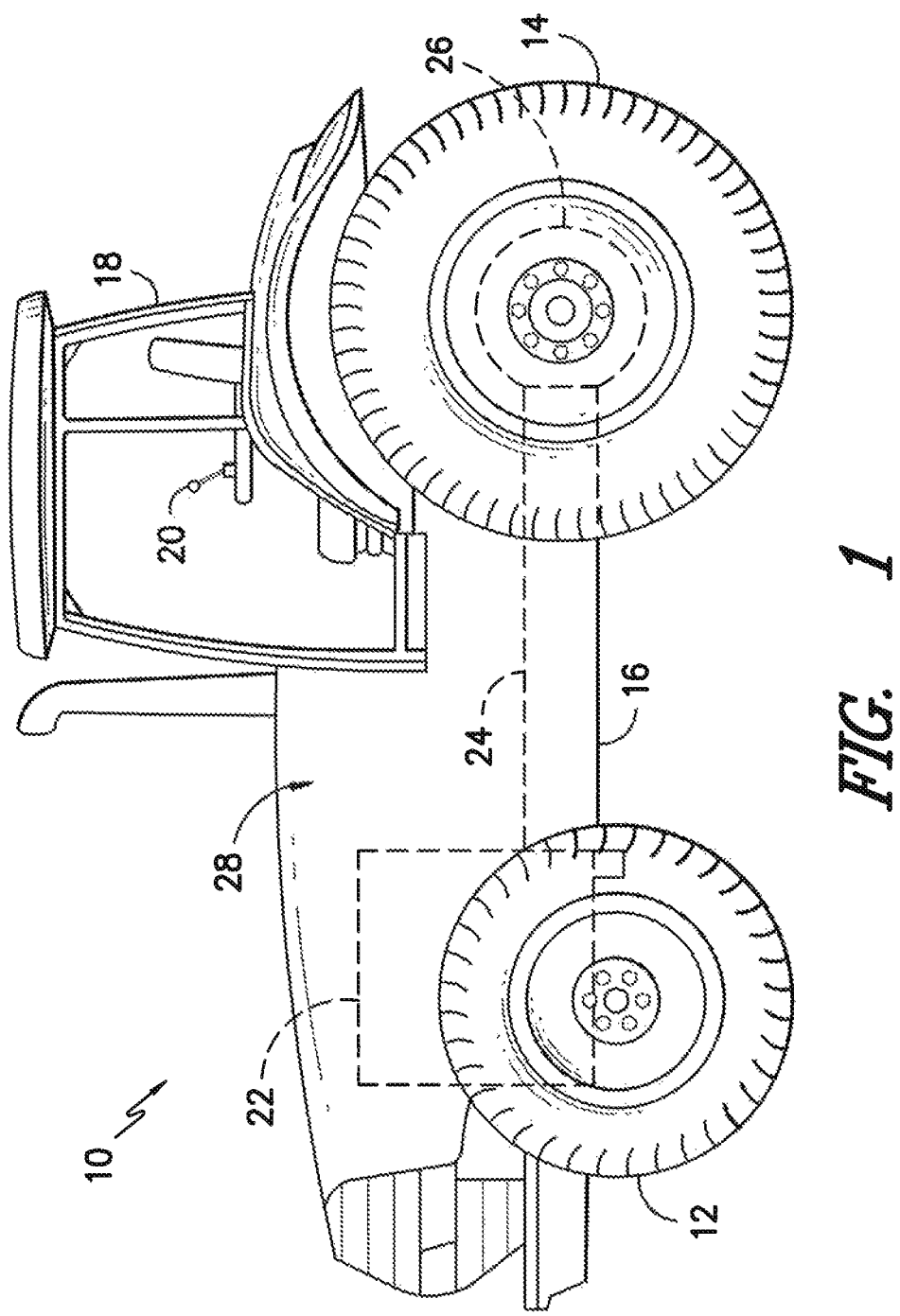
FIG. 1 illustrates a side view of one embodiment of a work vehicle.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, control panels and/or the like) for permitting an operator to control the operation of the work vehicle 10. For instance, one of the control devices 20 may comprise a shuttle lever (or shuttle button) configured to allow the operator to shift between forward, neutral and reverse operating modes (including the ability to make operator-initiated shuttle shifts). Additionally, the work vehicle 10 may include an engine 22 and a transmission 24 mounted on the chassis 16. The transmission 24 may be operably coupled to the engine 22 (e.g., via a damping coupler) and may provide variably adjusted gear ratios for transferring engine power to the wheels 14 via am axle/differential 26. The engine 22, transmission 24, and axle/differential 26 may collectively define a drive train 28 of the work vehicle 10.

It should be appreciated that the transmission 24 may generally comprise any suitable transmission known in the art having a plurality of different, fixed gear ratios. For example, in several embodiments, the transmission 24 may comprise a multispeed, power shift transmission having a plurality of selectable gear ratios (e.g., a plurality of selectable forward and reverse gear ratios) and a plurality of hydraulically actuated clutches that may be selectively actuated in order to engage the transmission in the differing gear ratios. In such embodiments, the clutches may be configured to be automatically engaged within the transmission 24. For instance, an electronic controller 102 of the work vehicle 10 (described below with reference to FIG. 3) may be configured to transmit suitable control commands or signals to the transmission 24 instructing it to actuate hydraulic pistons or other suitable actuators configured to engage/disengage the clutches. In other embodiments, the transmission 24 may comprise any other transmission suitable for use with a work vehicle 10, such as a continuously variable transmission.

It should also be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
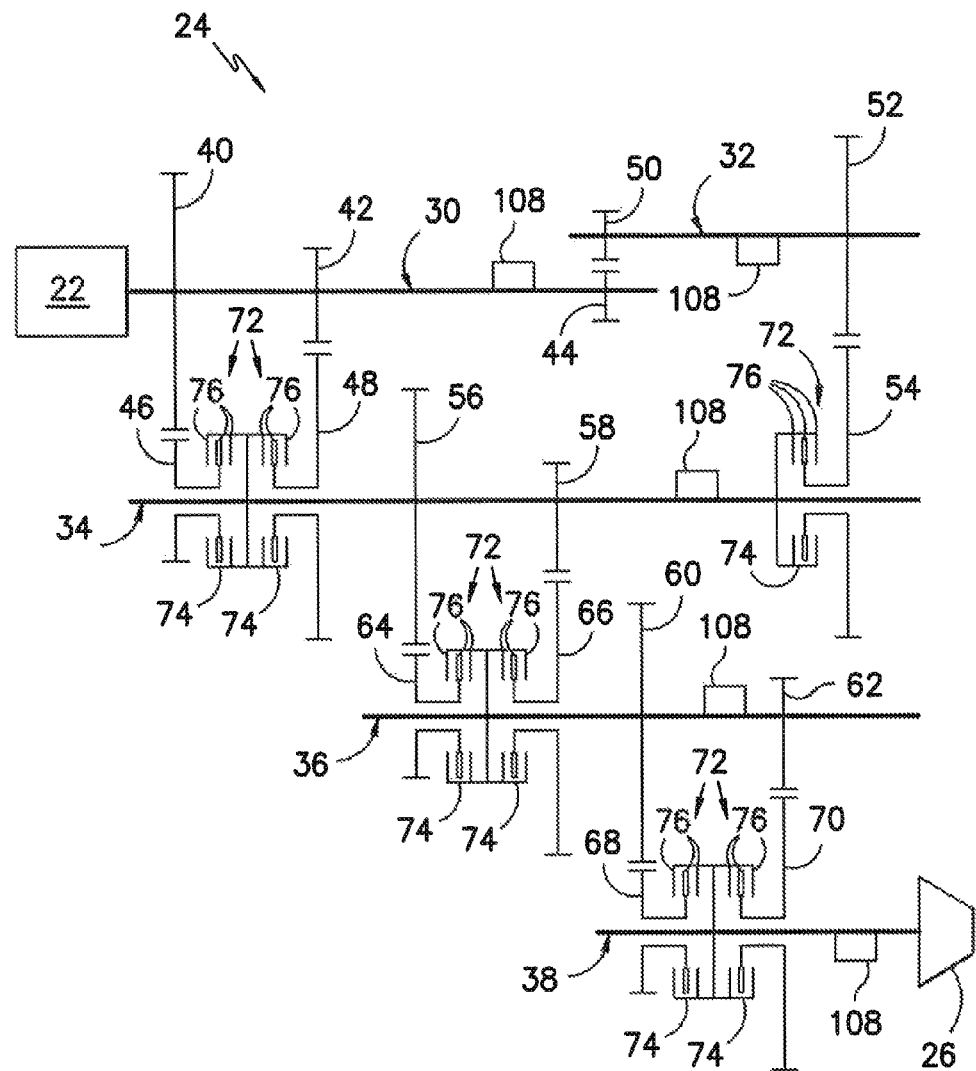
FIG. 2 illustrates a simplified, schematic view of one embodiment of a transmission suitable for use within the work vehicle shown in FIG. 1.

Referring now to FIG. 2, a simplified, schematic diagram of one embodiment of a transmission 24 suitable for use with the work vehicle 10 described above is illustrated in accordance with aspects of the present subject matter. As shown, the transmission 24 includes a plurality of shafts extending parallel to one another. For example, the transmission 24 may include an input shaft 30 operably connected to and driven by the engine 22. The transmission 24 may also include a counter shaft 32 extending parallel to the input shaft 30 for facilitating the reverse gear ratios of the transmission 24. In addition, the transmission 24 may include a plurality of driven shafts 34, 36, 38 extending parallel to the input and counter shafts 30, 32, with the driven shafts 34, 36, 38 forming different levels of direct gear engagements for adjusting the gear ratio of the transmission 24.

For instance, as shown in the illustrated embodiment, the transmission 24 includes a directional shaft 34 forming a first level of direct gear engagements, an intermediate shaft 36 forming a second level of direct gear engagements and an output shaft 38 forming a third level of direct gear engagements. The directional shaft 34 may generally be configured to be driven by the input shaft 30, either directly or indirectly via the counter shaft 32, in order to control the rotational direction of the driven shafts 34, 36, 38 and, thus, the direction of travel of the work vehicle (i.e., forward or reverse). For example, by engaging one of the forward directional gears 46, 48 (described below) of the directional shaft 34 such that the input shaft 30 directly drives the directional shaft 34, the transmission 24 may be engaged in a forward gear ratio, thereby resulting in forward motion of the work vehicle 10. Similarly, by engaging the reverse directional gear 54 (described below) of the directional shaft 34 such that the input shaft 30 indirectly drives the directional shaft 34 via the counter shaft 32, the transmission 24 may be engaged in a reverse gear ratio, thereby resulting in reverse motion of the work vehicle 10. Additionally, as shown in FIG. 2, the intermediate shaft 36 may be configured to be driven by the directional shaft 34 and the output shaft 38 may be configured to be driven by the intermediate shaft 36. As is generally understood, the output shaft 38 may be coupled to the differential 26 to allow the rotational motion of the output shaft 38 to be transferred to the wheels 14 of the work vehicle 10.

It should be appreciated that, in alternative embodiments, the transmission 24 may include any other number of driven shafts forming a corresponding number of direct gear engagement levels. For example, in various embodiments, the transmission 24 may only include two driven shafts forming two levels of direct gear engagements (e.g., by simply including the directional shaft 34 and the output shaft 38) or the transmission 24 may include four or more driven shafts forming four or more levels of direct gear engagements (e.g., by including the directional shaft 34, two or more intermediate shafts 36 and the output shaft 38).

Moreover, the transmission 24 may also include a plurality of gears installed on the parallel shafts 30, 32, 34, 36, 38. For example, as shown in the illustrated embodiment, the transmission 24 includes eight pairs of gears configured to provide eight forward gear ratios and four reverse ratios. Specifically, as shown in FIG. 2, the transmission 24 may include a first input gear 40, a second input gear 42 and a third input gear 44 mounted to the input shaft 30. The first input gear 40 may drive a first forward gear 46 configured to be selectively engaged with the directional shaft 34. Similarly, the second input gear 42 may drive a second forward gear 48 configured to be selectively engaged with the directional shaft 34. The third input gear 44 may generally be configured to drive the counter shaft 32. For example, as shown in FIG. 2, the counter shaft 32 may include a first counter gear 50 and a second counter gear 52 mounted thereon, with the first counter gear 50 being driven by the third input gear 44. The second counter gear 52 may, in turn, drive a reverse gear 54 configured to be selectively engaged with the directional shaft 34.

Additionally, the transmission 24 may include first and second drive gears 56, 58 mounted to the directional shaft 34 and third and fourth drive gears 60, 62 mounted to the intermediate shaft 36. The drive gears 56, 58, 60, 62 may generally be adapted to drive corresponding driven gears 64, 66, 68, 70 configured to be selectively engaged with the intermediate and output shafts 36, 38. For example, as shown in the illustrated embodiment, the first drive gear 56 may drive a first driven gear 64 configured to be selectively engaged with the intermediate shaft 36 and the second drive gear 58 may drive a second driven gear 66 configured to be selectively engaged with the intermediate shaft 36. Similarly, the third drive gear 60 may drive a third driven gear 68 configured to be selectively engaged with the output shaft 38 and the fourth drive gear 62 may drive a fourth driven gear 70 configured to be selectively engaged with the output shaft 38.

It should be appreciated that, in alternative embodiments, the transmission 24 may include any other number of gear pairs configured to provide any suitable number of forward and reverse gear ratios. For instance, in some work vehicles, it may be desirable for the transmission 24 to include a larger number of gear pairs, thereby providing a larger number of forward and/or reverse gear ratios (e.g., 24 or more forward ratios), to accommodate complicated loading conditions.

Moreover, as shown in FIG. 2, the transmission 24 may also include a plurality of hydraulically actuated clutches 72 for engaging the gear pairs with the driven shafts 34, 36, 38. Specifically, each clutch 72 may be associated with one of the gears configured to be selectively engaged with one of the driven shafts 34, 36, 38 (e.g., the first forward gear 46, the second forward gear 48, the reverse gear 54, and the first, second, third and fourth driven gears 64, 66, 68, 70). In several embodiments, each clutch 72 may include one or more hydraulic pistons or other suitable hydraulic actuators 74 configured to engage corresponding friction plates 76 coupled to both the gear and the driven shaft. Thus, when pressurized hydraulic fluid is supplied within the clutch 72, the friction plates 76 may be pressed together such that the plates 76 frictionally and rotationally engage one another, thereby permitting torque to be transmitted between two of the parallel shafts 30, 32, 34, 36, 38. For example, by actuating the clutch 72 associated with the first forward gear 46, torque may be transmitted from the input shaft 30 to the directional shaft 34 via the gear pair including first input gear 40 and the first forward gear 46. Similarly, torque may be transmitted from the directional shaft 34 to the intermediate shaft 36 and from the intermediate shaft 36 to the output shaft 38 by actuating one of the clutches 72 associated with each of such driven shafts 36, 38. Thus, by varying the combination of actuated clutches 72 within the transmission 24 (i.e., one clutch 72 per driven shaft 34, 36, 38), the transmission 24 may be engaged in various different forward and reverse gear ratios.

Figure 3:
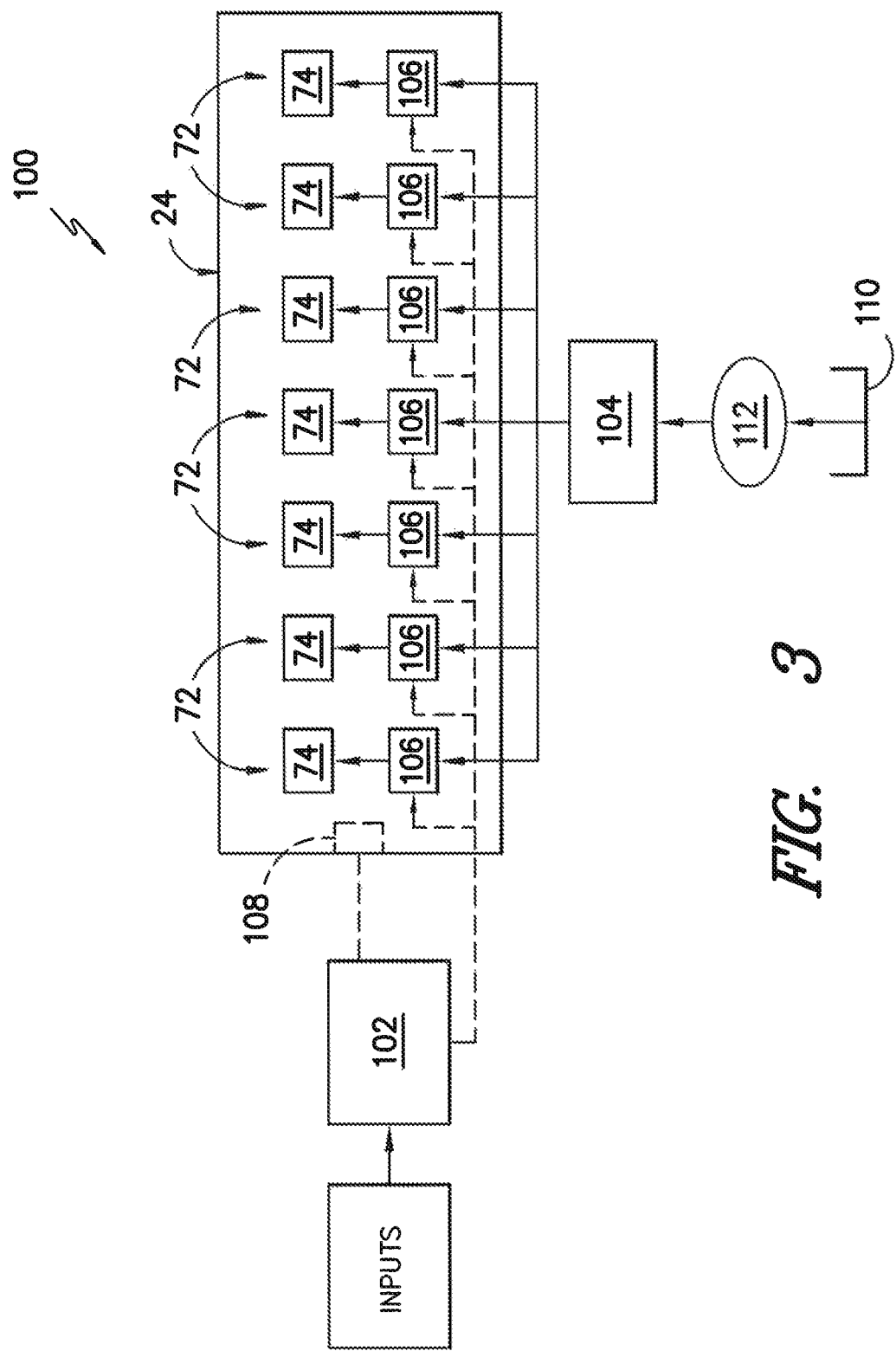
FIG. 3 illustrates a schematic view of one embodiment of a system for performing a shuttle shift with a transmission of a work vehicle.

Referring now to FIG. 3, a schematic diagram of one embodiment of a system 100 for performing a shuttle shift with a transmission 24 of a work vehicle 10 is illustrated in accordance with aspects of the present subject matter. As shown, the system 100 may include a controller 102 configured to control the operation of the various components disposed within and/or associated with the transmission 24. For example, as will be described in greater detail below, the controller 102 may be communicatively coupled to one or more valves disposed within and/or associated with the transmission 24 (e.g., a system valve 104 and a plurality of clutch valves 106) in order to control the pressure of the hydraulic fluid supplied within the transmission 24, thereby permitting the controller 102 to control the engagement and/or disengagement of the various clutches 72 of the transmission 24.

It should be appreciated that the controller 102 may generally comprise any suitable computer and/or other processing unit, including any suitable combinations of computers and/or other processing units. Thus, in several embodiments, the controller 102 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 102 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 102 to perform various computer-implemented functions, such as by performing the steps and/or calculations of the method 200 described below with reference to FIG. 4. In addition, the controller 102 may also include various other suitable components, such as a communications circuit or module, one or more input/output channels, a data/control bus and/or the like.

Additionally, the system 100 may also include one or more sensors 108 configured to monitor the rotational speeds of the various shafts 30, 32, 34, 36, 38 of the transmission 24. For example, as shown in FIGS. 2 and 3, the transmission 24 may, in one embodiment, include one or more speed sensors 108 (e.g., shaft encoders, shaft sensors and/or any other suitable speed sensors) mounted to and/or within each shaft 30, 32, 34, 36, 38 so as to measure the rotational shaft speeds. The speed sensors 108 may, in turn, be communicatively coupled to the controller 102 to permit the speed measurements to be transmitted to the controller(s) 102 for subsequent processing and/or analysis.

Moreover, the system 100 may also include various components for supplying hydraulic fluid into and/or within the transmission 24. For example, as shown in the illustrated embodiment, the system 100 may include a holding tank 110 configured to hold or otherwise contain the hydraulic fluid to be supplied within the transmission 24. In addition, the system 100 may include a pump 112 configured to transfer the hydraulic fluid from the holding tank 110 to a pressure control valve 104 (hereinafter referred to as the "system valve 104") positioned downstream of the pump 112. The system valve 104 may be communicatively coupled to the controller 102 such that the operation of the valve 104 may be electronically controlled in order to regulate the pressure of the hydraulic fluid supplied to the clutches 72 of the transmission 24. Thus, it should be appreciated that the system valve 104 may generally comprise any suitable electronic valve that may be configured to provide a variable pressure output. For example, in one embodiment, the system valve 104 may comprise an electronic, solenoid activated proportional valve or any other suitable variable pressure control valve.

By controlling the operation of the system valve 104, the controller 102 may be configured to regulate the particular pressure at which the hydraulic fluid is supplied to all of the clutches 72 (hereinafter referred to as the "system pressure"). In addition, the controller 102 may also be configured to individually regulate the pressure of the hydraulic fluid supplied within each clutch 72. Specifically, as shown in FIG. 3, each clutch 72 may include an individual clutch valve 106 configured to regulate the pressure of the hydraulic fluid supplied to its corresponding hydraulic actuator 74 (hereinafter referred to as the "clutch pressure"). Each clutch valve 106 may be communicatively coupled to the controller 102 such that the operation of the valve 106 may be electronically controlled. Thus, when a particular clutch 72 is to be engaged within the transmission 24, its clutch valve 106 may be controlled so as to supply hydraulic fluid to the corresponding actuator 74 at a given clutch pressure.

Similar to the system valve 104 described above, it should be appreciated that the clutch valves 106 may generally comprise any suitable electronic valve that may be configured to provide a variable pressure output. For example, in one embodiment, each clutch valve 106 may comprise an electronic, solenoid activated proportional valve or any other suitable variable pressure control valve.

During operation of the disclosed system 100, the controller 102 may be configured to receive various system inputs. For instance, in several embodiments, the controller 102 may be configured to receive a shuttle shift command (e.g., from one or more of the control devices 20 housed within the cab 18) instructing the controller to perform a shuttle shift. Upon receipt of a shuttle shift command, the controller 102 may be configured to transmit suitable control commands to the clutch valves 106 for disengaging and/or engaging the clutches 72 of the transmission 24 in accordance with the method described below with reference to FIG. 4.

Figure 4:
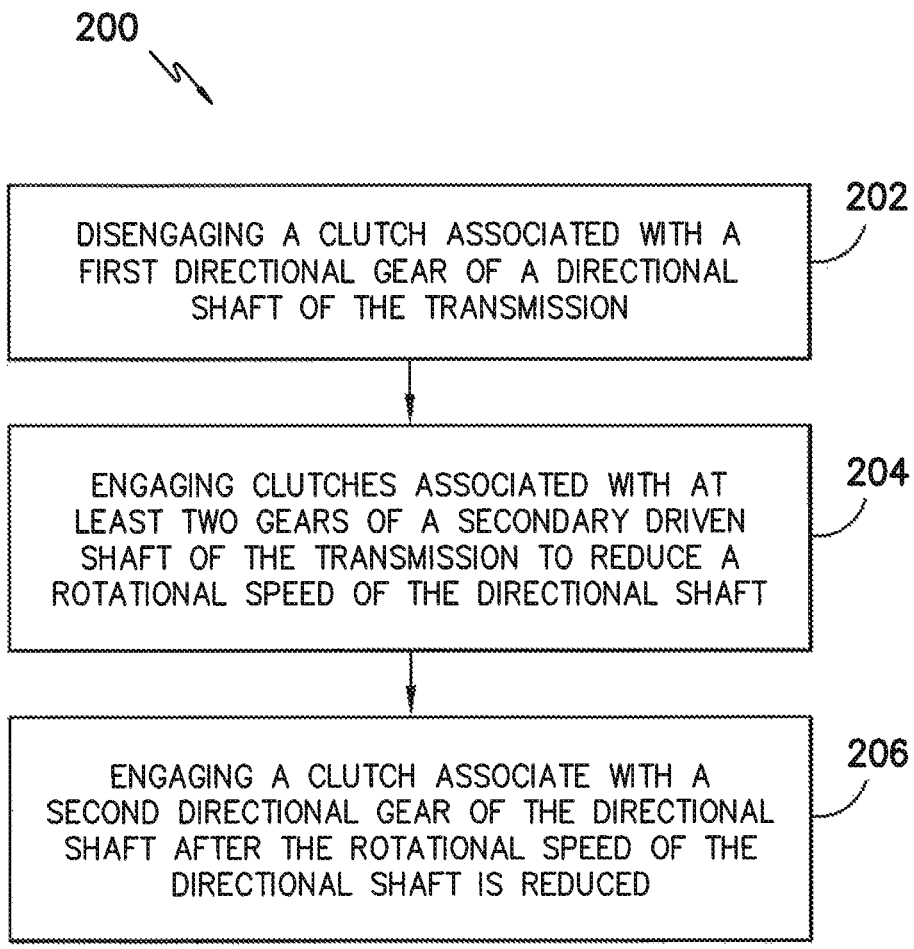
FIG. 4 illustrates a flow diagram of one embodiment of a method for performing a shuttle shift with a transmission of a work vehicle.

Referring now to FIG. 4, a flow diagram of one embodiment of a method 200 for performing a shuttle shift with a transmission 24 of a work vehicle 10 is illustrated in accordance with aspects of the present subject matter. As shown, the method 200 generally includes disengaging a clutch associated with a first directional gear of a directional shaft of the transmission 202, engaging clutches associated with at least two gears of a secondary driven shaft of the transmission to reduce a rotational speed of the directional shaft 204 and engaging a clutch associated with a second directional gear of the directional shaft after the rotational speed of the directional shaft is reduced 206.

In general, the disclosed method 200 may allow for a shuttle shift to be performed without overheating or overloading the clutches associated with the directional gears of the transmission 24 (i.e., the first forward gear 46, the second forward gear 48 and the reverse gear 54). Specifically, at the initiation of a shuttle shift, the clutch 72 associated with the engaged directional gear (i.e., the first or second forward gear 46, 48 if the vehicle 10 is traveling forward or the reverse gear 54 if the vehicle is traveling in reverse) may be disengaged, thereby decoupling the input shaft 30 from the directional shaft 34 and stopping the transmission of torque from the engine 22 to the transmission 24. Thereafter, instead of immediately engaging the clutch 72 associated with the opposite directional gear, clutches 72 associated with at least two gears of a secondary driven shaft of the transmission 24 (e.g., the intermediate shaft 36 or the output shaft 38) may be engaged to stop or otherwise reduce the rotational speed of the directional shaft 34 (e.g., via a "four-squaring" effect). Once the directional shaft 34 is stopped or its rotational speed is otherwise sufficiently reduced, the clutch 72 associated with the opposite directional gear may then be engaged to allow the directional shaft 34 to be rotated in the opposite direction.

It should be appreciated that, by stopping or otherwise reducing the rotational speed of the directional shaft 34 using clutches 72 associated with the intermediate and/or output shaft 36, 38 and then increasing the rotational speed of the directional shaft 34 in the opposite direction using the clutch 72 associated with the appropriate directional gear, the loads transferred through the transmission 24 during the shuttle shift may be shared or divided between different sets of clutches 72. As such, the average load carried by each clutch 72 may be reduced. Additionally, since the clutches 72 associated with the intermediate and output shafts 36, 38 are typically more robust and have significantly higher torque carrying capacities than the clutches 72 associated with the directional shaft 34, such clutches 72 are better equipped to dispatch the heat and/or withstand the loads associated with slowing down and/or stopping the directional shaft 34 during a shuttle shift. Thus, by using the clutches 72 associated with the intermediate and output shafts 36, 38, the thermal and torque loads associated with shuttle shifts may be directed away from the weaker clutches 72 of the directional shaft 34, thereby preventing component damage and enhancing the life and reliability of the entire transmission 24.

It should also be appreciated that, in several embodiments, the disclosed method 200 may be implemented automatically using the controller 102 of the work vehicle 10. For instance, as indicated above, the controller 102 may be configured to receive an operator input (e.g., in the form of a shuttle shift command) indicating that a shuttle shift is to be performed. Upon receipt of the operator input, the controller 102 may then control the pressure of the hydraulic fluid supplied to the transmission to engage and/or disengage the appropriate clutches 72.

As shown in FIG. 4, in 202, at the initiation of the shuttle shift, the controller 102 may be configured to disengage the clutch 72 associated with the currently engaged directional gear, thereby decoupling the directional shaft 34 from the input shaft 30. In particular, if the work vehicle 10 is traveling in the forward direction at the initiation of the shuttle shift, the controller 102 may be configured to disengage the clutch 72 associated with the first forward gear 46 or the second forward gear 48. For example, the controller 102 may be configured to transmit a suitable control signal to the clutch valve(s) 106 controlling the supply of hydraulic fluid to the clutch 72 for the first or second forward gear 46, 48 in order to reduce the pressure of the hydraulic fluid supplied to such clutch 72. Similarly, if the work vehicle 10 is traveling in the reverse direction at the initiation of the shuttle shift, the controller 102 may be configured to disengage the clutch 72 associated with the reverse gear 54, such as by reducing the pressure of the hydraulic fluid supplied to such clutch 72.

Additionally, in 204, after disengaging the clutch 72 associated with appropriate directional gear, the controller 102 may be configured to engage the clutches 72 associated with at least two gears of a separate driven shaft of the transmission 24 in order to stop or otherwise reduce the rotational speed of the directional shaft 34. For example, in several embodiments, the clutches 72 for the driven gears 64, 66 of the intermediate shaft 36 may be engaged to stop or otherwise slow down the directional shaft 34. Specifically, as shown in FIG. 2, the clutches 72 for the first driven gear 64 and the second driven gear 66 of the intermediate shaft 36 may be engaged simultaneously. In such an embodiment, it should be appreciated that, at the initiation of the shuttle shift, one of the clutches 72 of the intermediate shaft 36 may already be engaged. Thus, once the appropriate directional gear is disengaged in 202 of the disclosed method 200, the previously engaged clutch 72 of the intermediate shaft 36 may be maintained in engagement while the remaining clutch is engaged. As is generally understood, such simultaneous engagement of both clutches 72 of the intermediate shaft 36 may generally result in the rotational speeds of both the directional and intermediate shafts 34, 36 being reduced.

It should be appreciated by those of ordinary skill in the art that, by simultaneously engaging the clutches 72 associated with two or more gears of the same shaft, a "four-squaring" type effect may be provided, whereby one or more of the shafts of the transmission 24 are brought to a complete and sudden stop. To avoid such an event, the clutches 72 associated with such gears may be partially engaged by carefully modulating the pressure of the hydraulic fluid supplied to the clutches 72, thereby providing for a controlled deceleration of the directional and intermediate shafts 34, 36. For instance, as indicated above, at the initiation of a shuttle shift, the intermediate shaft 36 may include both an engaged clutch 72 and a non-engaged clutch 72. Thus, to partially engage both clutches 72, the hydraulic pressure supplied to the previously engaged clutch 72 may be gradually decreased while the hydraulic pressure to the previously non-engaged clutch 72 may be gradually increased. Such modulation of the pressure of the hydraulic fluid supplied to the clutches 72 may generally allow for the rotational speed of the directional and intermediate shafts 34, 36 to be reduced in a controlled manner without causing a sudden lock-up of the transmission 24, thereby resulting in a partial "four-squaring" or controlled braking effect. As used herein, a clutch 72 is "partially engaged" or "partially disengaged" when the pressure of the hydraulic fluid supplied to the clutch 72 is controlled to allow the clutch 72 to slip for a dedicated period of time before locking up. For example, the pressure may be controlled to the minimum pressure required to carry the amount of torque needed to slow the shaft(s) down at a designated rate.

It should also be appreciated that, when the clutches 72 for the intermediate shaft 36 are being used to stop or otherwise slow the rotation of the directional shaft 34, the clutches 72 for the output shaft 38 may be fully disengaged in order to decouple the intermediate shaft 36 from the output shaft 38, thereby preventing the motion of the work vehicle 10 from being affected by any changes in the rotational speed of the intermediate shaft 36. Alternatively, one or more of the clutches 72 for the output shaft 38 may be partially engaged, thereby providing an additional torque load to assist in stopping or otherwise slowing down the directional and intermediate shafts 34, 36. In addition, such partial engagement of the clutch(es) 72 of the output shaft 38 may also allow for the speed of the work vehicle 10 to be effectively reduced.

As an alternative to engaging the clutches 72 associated with two or more gears of the intermediate shaft 36, clutches 72 associated with two or more of the gears of the output shaft 38 may be engaged to stop or otherwise slow the rotation of the directional shaft 34. For example, referring to the embodiment shown in FIG. 2 and assuming that at least one clutch 72 of the intermediate shaft 36 is maintained in engagement, the clutches 72 associated with the third driven gear 68 and the fourth driven gear 70 of the output shaft 38 may be engaged simultaneously to reduce the rotational speed of the directional shaft 34 (as well as the rotational speeds of the intermediate and output shafts 36, 38). In such an embodiment, similar to embodiment described above, the clutches 72 for the output shaft 38 may be partially engaged (e.g., by modulating the pressure of the hydraulic fluid supplied to the clutches 72) to provide a controlled deceleration of the directional, intermediate and output shafts 34, 36, 38. Moreover, by using the clutches 72 of the output shaft 38 as a braking means, the speed of the work vehicle 10 may be simultaneously decreased.

Referring still to FIG. 4, in 206, after the rotational speed of the directional shaft 34 has been reduced, the controller 102 may be configured to engage the clutch 72 associated with the opposite directional gear to allow the directional shaft 34 to be rotated in the opposite direction. For example, if the work vehicle 10 was traveling in the forward direction at the initiation of the shuttle shift, the controller 102 may be configured to engage the clutch 72 associated with the reverse gear 54, thereby permitting the input shaft 30 to rotate the directional shaft 34 in the reverse direction. Similarly, if the work vehicle 10 was traveling in the reverse direction at the initiation of the shuttle shift, the controller 102 may be configured to engage the clutch 72 associated with the first forward gear 46 or the second forward gear 48, thereby allowing the input shaft 30 to rotate the direction shaft 34 in the forward direction.

In one embodiment, it should be appreciated that the controller 102 may be configured to engage the clutch 72 associated with the opposite directional gear as soon as (or after) the rotation of the directional shaft 34 is stopped. For example, the controller 102 may be configured to monitor the rotational speed of the directional shaft 34 (via the sensors 108 described above) and may engage the clutch 72 associated with the opposite directional gear when the rotational speed of the directional shaft 34 is reduced to zero. Alternatively, the controller 102 may be configured to monitor the rotational speed of the directional shaft 34 such that the clutch 72 associated with the opposite directional gear may be engaged when the rotational speed reaches a minimum speed threshold. For instance, the minimum speed threshold may correspond to a rotational speed of the directional shaft 34 at which it is believed that the clutch 72 associated with the opposite directional gear may be engaged without overloading or overheating the clutch 72.

Additionally, as the clutch 72 associated with the opposite directional gear is engaged, the clutches 72 associated with the driven gears of the intermediate shaft 36 (and optionally the clutches 72 associated with the driven gears of the output shaft 38) may be disengaged to allow the directional shaft 34 to be brought up to speed. Once the directional shaft 34 is rotating at a sufficient speed, the clutches 72 required to achieve the desired gear ratio (i.e., clutches associated with one of the driven gears of the intermediate shaft 36 and one of the driven gears of the output shaft 38) may then be engaged by gradually increasing the pressure of the hydraulic fluid supplied to such clutches 72, thereby fully engaging the transmission 24 and allowing the work vehicle 10 to travel in the new direction.

Referring back to FIG. 2, to provide a specific example of the disclosed method 200, it may be assumed that the work vehicle 10 is initially traveling in a forward direction with the clutches 72 for the first forward gear 46, the first driven gear 64 and the third driven gear 68 being engaged. At the initiation of a shuttle shift (i.e., indicating that the direction of travel of the work vehicle 10 is being switched from forward to reverse), the clutch 72 for the first forward gear 46 may be disengaged, thereby decoupling the directional shaft 34 from the input shaft 30. In addition, the clutch 72 for the third driven gear 68 may be fully or partially disengaged. Thereafter, the pressure of the hydraulic fluid supplied to the clutch 72 for the first driven gear 64 may be gradually reduced while the pressure of the hydraulic fluid supplied to the clutch 72 for the second driven gear 66 may be gradually increased, thereby partially engaging both clutches 72 of the intermediate shaft 36 to allow the rotational speed of the directional shaft 34 to be reduced. When the directional shaft 34 stops rotating in its original direction (or when the rotational speed of the directional shaft 34 drops below a minimum speed threshold), the clutches 72 for the first and second forward gears 64, 66 of the intermediate shaft 34 may be disengaged. The clutch 72 for the reverse gear 54 may then be engaged to allow the directional shaft 34 to be rotate in the opposition direction. After the rotational speed of the directional shaft 34 has been sufficiently increased, the appropriate clutches for the intermediate and output shafts 36, 38 may then be engaged in order to engage the transmission 24 in the desired gear ratio.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for performing a shuttle shift with a transmission of a work vehicle, the transmission including at least an input shaft, an output shaft, a counter shaft, and a plurality of driven shafts, the method comprising:
   initiating the shuttle shift by
   disengaging a clutch associated with a first directional gear of a directional driven shaft of the plurality of driven shafts and the input shaft to eliminate any driving connection between the input shaft and the directional driven shaft, the first directional gear being configured to rotate the directional driven shaft in a first direction;
   disengaging a clutch associated with a second driven gear of at least one secondary driven shaft of the plurality of driven shafts and the output shaft to eliminate any driving connection between the output shaft and the at least one secondary driven shaft;
   engaging or maintaining an existing engagement of two or more clutches associated with at least two gears of the at least one secondary driven shaft of the plurality of driven shafts to reduce a rotational speed of at least the directional driven shaft; and
   after rotational speed of at least the directional driven shaft is at least reduced,
   disengaging the two or more clutches associated with the at least two gears of the at least one secondary driven shaft of the plurality of driven shafts to permit at least the directional driven shaft to be brought up to speed in a second direction;
   engaging at least one clutch associated with a second directional gear operably engaged with the input shaft and the directional driven shaft of the plurality of driven shafts to cause rotation of at least the directional driven shaft in the second direction, while the output shaft remains disconnected; and
   after rotation of at least the directional driven shaft is brought up to speed in the second direction,
   engaging clutches associated with driven gears operably engaged with the directional driven shaft and the at least one secondary driven shaft of the plurality of driven shafts to establish a driving connection between the directional driven shaft and the at least one secondary driven shaft; and
   engaging clutches associated with driven gears operably engaged with the at least one secondary driven shaft of the plurality of driven shafts and the output shaft to establish a driving connection between the at least one secondary driven shaft and the output shaft, resulting in full engagement of the transmission to permit travel of the work vehicle in the second direction.

2. The method of claim 1, wherein the disengaging of the clutch associated with the first directional gear of the directional driven shaft of the plurality of driven shafts further comprises disengaging the clutch associated with one of a forward gear or a reverse gear of the directional shaft.

3. The method of claim 1, wherein the engaging or maintaining an existing engagement of one or more of the clutches associated with the at least two gears of the at least one secondary driven shaft of the plurality of driven shafts further comprises, if one clutch is already engaged prior to initiation of the shuttle shift:
   establishing and maintaining a partial engagement of one clutch engaged prior to initiation of the shuttle shift of the at least one secondary driven shaft, while initiating a partial engagement of one other clutch of the at least one secondary driven shaft; and
   wherein the engaging or maintaining an existing engagement of one or more of the clutches associated with the at least two gears of the at least one secondary driven shaft of the plurality of driven shafts further comprises, if the one clutch is not engaged prior to initiation of the shuttle shift;
   initiating and maintaining a partial engagement of at least two clutches.

4. The method of claim 3, wherein the establishing and maintaining the partial engagement of the one clutch engaged prior to initiation of the shuttle shift of the at least one secondary driven shaft further comprises gradually reducing the pressure of a hydraulic fluid supplied to the one clutch, and wherein the initiating the partial engagement of the one other clutch of the at least one secondary driven shaft further comprises gradually increasing the pressure of a hydraulic fluid supplied to the previously non-engaged clutch, and wherein the initiating and maintaining the partial engagement of the clutches further comprises gradually increasing the pressure of hydraulic fluid supplied to the at least two clutches.

5. The method of claim 1, wherein the engaging or maintaining an existing engagement of the two or more clutches associated with the at least two gears of the at least one secondary driven shaft of the plurality of driven shafts further comprises engaging clutches associated with at least two gears of an intermediate shaft of the plurality of driven shafts.

6. The method of claim 5, further comprising disengaging the two or more clutches associated with the at least two gears of the intermediate shaft when rotation of the directional driven shaft is stopped.

7. The method of claim 5, further comprising partially or fully disengaging a clutch associated with a gear of an output shaft when the clutch associated with the first directional gear is disengaged.

8. The method of claim 1, wherein the engaging or maintaining an existing engagement of two or more of the clutches associated with the at least two gears of the at least one secondary driven shaft of the plurality of driven shafts further comprises engaging clutches associated with at least two gears of an output shaft.

9. The method of claim 1, wherein the engaging of the clutch associated with the second directional gear operably engaged with the input shaft and the directional driven shaft further comprises engaging the clutch associated with the second directional gear when rotation of the directional driven shaft is stopped.

10. The method of claim 1, wherein the engaging of the clutch associated with the second directional gear further comprises engaging the clutch associated with the second directional gear when the rotational speed of the directional driven shaft falls below a minimum speed threshold.

11. The method of claim 1, wherein the at least one secondary driven shaft further comprises an intermediate shaft and an output shaft, and further comprising engaging clutches associated with gears of the intermediate shaft and the output shaft after the clutch associated with the second directional gear is engaged.

12. A system for performing a shuttle shift when operating a work vehicle, the system comprising:
a transmission including an input shaft, an output shaft, a counter shaft and a plurality of driven shafts extending parallel to the input and counter shafts, the plurality of driven shafts including a directional driven shaft and at least one secondary shaft;
a controller communicatively coupled to the transmission, the controller being configured to initiate a shuttle shift via
disengagement of a clutch associated with a first directional gear of the directional driven shaft of the plurality of driven shafts from the input shaft to eliminate any driving connection between the input shaft and the directional driven shaft, the first directional gear configured to rotate the directional driven shaft in a first direction; and
disengagement of a clutch associated with a second driven gear of the at least one secondary driven shaft of the plurality of driven shafts from the output shaft to eliminate any driving connection between the output shaft and the at least one secondary driven shaft;
the controller being further configured to
engage or maintain in an existing engagement two or more clutches associated with at least two gears of the at least one secondary driven shaft of the plurality of driven shafts to reduce a rotational speed of at least the directional driven shaft;
wherein after rotational speed of at least the directional driven shaft is at least reduced, the controller is configured to
disengage the two or more clutches associated with the at least two gears of the at least one secondary driven shaft of the plurality of driven shafts to permit at least the directional driven shaft to be brought up to speed in a second direction;
engage at least one clutch associated with a second directional gear operably engaged with the input shaft and the directional driven shaft of the plurality of driven shafts to cause rotation of at least the directional driven shaft in the second direction, while the output shaft remains disconnected; and
after rotation of at least the directional driven shaft is brought up to speed in the second direction,
engage clutches associated with driven gears operably engaged with the directional driven shaft and the at least one secondary driven shaft of the plurality of driven shafts to establish a driving connection between the directional driven shaft and the at least one secondary driven shaft; and
engage clutches associated with driven gears operably engaged with the at least one secondary driven shaft of the plurality of driven shafts and the output shaft to establish a driving connection between the at least one secondary driven shaft and the output shaft, resulting in full engagement of the transmission to permit travel of the work vehicle in the second direction.

13. The system of claim 12, wherein the first directional gear comprises one of a forward gear or a reverse gear of the transmission and the second directional gear comprises the other of the forward gear or the reverse gear.

14. The system of claim 12, wherein the controller is configured to establish and maintain a partial engagement of the clutches associated with the at least two gears of the at least one secondary driven shaft.

15. The system of claim 12, wherein the at least one secondary driven shaft comprises at least one of an intermediate shaft of the transmission or an output shaft of the transmission.

16. The system of claim 12, wherein the controller is configured to engage the clutch associated with the second directional gear when the rotation of the directional driven shaft in the first direction is stopped.

17. The system of claim 12, wherein the controller is configured to engage the clutch associated with the second directional gear when the rotational speed of the directional driven shaft in the first direction falls below a minimum speed threshold.

* * * * *